May 27, 1924.
C. H. W. SMITH
HORIZONTAL BAR
Filed April 20, 1923
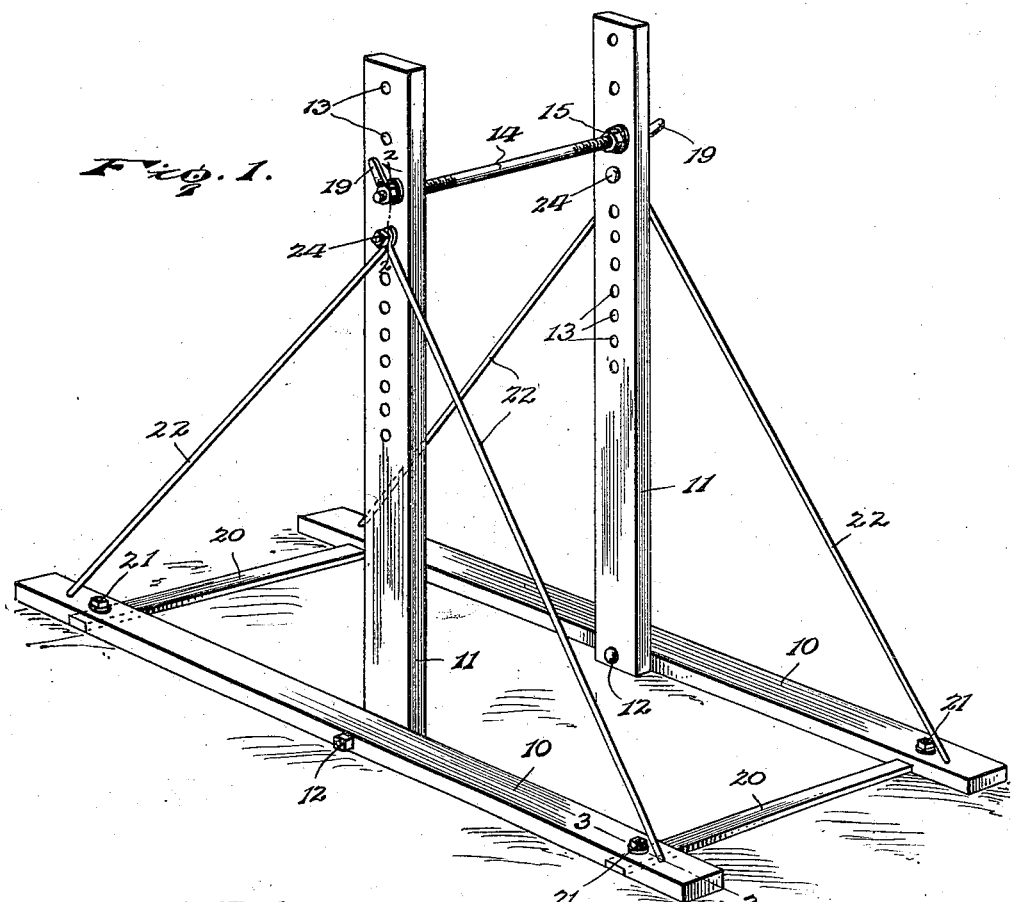
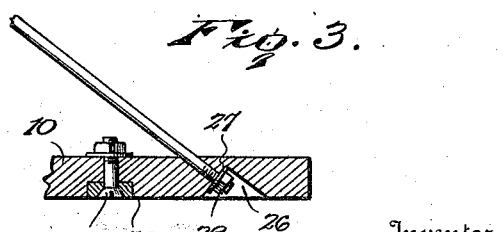
Inventor
C.H.W. Smith.
By Lacy & Lacy, Attorneys Patented May 27, 1924.

1,495,536

UNITED STATES PATENT OFFICE.

CLAIRE H. W. SMITH, OF SAN ACACIO, COLORADO.

HORIZONTAL BAR.

Application filed April 20, 1923. Serial No. 633,531.

*To all whom it may concern:*

Be it known that I, CLAIRE H. W. SMITH, citizen of the United States, residing at San Acacio, in the county of Costilla and State of Colorado, have invented certain new and useful Improvements in Horizontal Bars, of which the following is a specification.

The invention relates to an improved horizontal bar particularly designed for use by children and seeks, among other objects, to provide a device of this character of such proportion and size that it may be readily set up in a home for use by a child and which will provide both exercise and amusement for the child.

The invention seeks as a further object, to provide a device of this character which will combine maximum strength with the greatest simplicity of construction while, at the same time. embodying possibility of adjustment of the bar to various heights.

And the invention seeks, as a still further object, to provide a device which may be readily taken apart and compactly stored or shipped.

Other and incidental objects will appear hereinafter.

In the drawings:

Figure 1 is a perspective view of my improved horizontal bar.

Figure 2, is an enlarged detail sectional view on the line 2—2 of Figure 1, looking in the direction of the arrows, and Figure 3 is a detail sectional view on the line 3—3 of Figure 1.

In carrying the invention into effect, I employ spaced parallel base planks or members 10 and secured against the inner edges of said planks are medially disposed uprights 11 detachably connected with the planks by bolts 12 extending through the width of the planks and through said uprights. At their lower ends, the uprights lie flush with the bottom faces of the planks and formed in the upper end portions of the uprights are vertically spaced alined openings 13. As brought out in Figure 1, the spacing between said openings is preferably increased near the upper ends of the uprights and formed to extend freely through said openings is a horizontal bar 14. Threaded upon the bar to abut the inner faces of the uprights are nuts 15 which, as brought out in Figure 2, are formed with annular base flanges 16 providing a flat bearing surface of corresponding area to engage the uprights. Threaded upon the ends of the bar to abut the outer faces of the uprights are nuts 17 which, like the nuts 15, are provided with annular base flanges 18 to engage the uprights, and extending from said nuts are handles 19. Thus, the bar will rigidly connect the uprights while the nuts 15 and 17 will coact therewith for rigidly locking the uprights against sidewise movement. At the same time, the height of the bar may be readily varied by changing the position of the bar longitudinally of the uprights, the spacing of the openings 13 being such that the bar may be arranged at practically any elevation desired. The handles 19 are, of course, provided upon the nuts 18 to facilitate the removal and adjustment of the bar.

Rigidly connecting the base planks 10 near the ends thereof are transversely disposed flat tie rods 20 countersunk in the bottom faces of the planks and extending through the planks and through said rods are bolts 21 detachably connecting the rods with the planks. Extending between the upper end portions of the uprights and the end portions of the base planks are brace rods 22, a pair of said rods being employed in connection with each of the uprights. At their upper ends, these rods are, as shown in Figure 2, provided with eyes 23 and extending through the uprights and through said eyes are bolts 24 detachably connecting the rods with the uprights, washers 25 being preferably employed upon the bolts to lie against the outer faces of the uprights. At their lower ends, the rods 22 extend, as shown in detail in Figure 3, into oblique recesses 26 in the bottom faces of the base planks and surrounding the rods are washers 27 with which coact nuts 28 detachably connecting the rods at their lower ends with the planks. Thus, the nuts 28 may be adjusted for tensioning the rods so that said rods will function to rigidly hold the uprights in vertical position, the tie rods 20, the brace rods 22, and the horizontal bar 14 cooperating with the uprights and with the base planks to produce an entirely rigid structure. At the same time, but few parts are employed and, as will be perceived in view of the foregoing, all of the elements of the device may be detached from each other so that the device may be readily taken apart and compactly stored. Since, as previously intimated, the device is particularly designed for use by children, the parts of the device will be proportioned accordingly and by constructing the base planks 10 and uprights 11 of wood, the weight of the device may be maintained at a minimum. Thus, the device may be readily lifted and moved from place to place.

Having thus described the invention, what is claimed as new is:

A device of the character described including spaced parallel elongated base members, tie rods connecting the members near the ends thereof, medially disposed uprights rising from the members, brace rods extending between the upper end portions of said uprights and the end portions of said base members holding the uprights in vertical position, a horizontal bar extending through the uprights, and nuts threaded upon said bar to engage opposite side faces of each of said uprights connecting the bar with the uprights and cooperating between the bar and said uprights for locking the uprights against sidewise movement.

In testimony whereof I affix my signature.

CLAIRE H. W. SMITH. [L. S.]